United States Patent [19]
Ishii

[11] Patent Number: 5,390,906
[45] Date of Patent: Feb. 21, 1995

[54] PAPER SUPPLYING DEVICE

[75] Inventor: Yoshifumi Ishii, Osaka, Japan

[73] Assignee: Mita Industrial Co., Ltd., Osaka, Japan

[21] Appl. No.: 26,804

[22] Filed: Mar. 5, 1993

[30] Foreign Application Priority Data

Mar. 7, 1992 [JP] Japan .................. 4-084741
Mar. 7, 1992 [JP] Japan .................. 4-084742

[51] Int. Cl.⁶ .............................. B65H 5/00
[52] U.S. Cl. ..................... 271/10; 271/114; 271/119; 271/122
[58] Field of Search ........ 271/10, 114, 117, 119, 271/121, 122, 126, 272

[56] References Cited

U.S. PATENT DOCUMENTS

| | | | |
|---|---|---|---|
| 3,961,786 | 6/1976 | Yanker | 271/10 X |
| 4,635,922 | 1/1987 | Roetter et al. | 271/119 |
| 4,779,861 | 10/1988 | Ozawa et al. | 271/119 |
| 4,794,419 | 12/1988 | Shibazaki et al. | |
| 5,203,553 | 4/1993 | Chiang | 271/10 |

FOREIGN PATENT DOCUMENTS

| | | |
|---|---|---|
| 0291042 | 11/1988 | European Pat. Off. . |
| 0361459 | 4/1990 | European Pat. Off. . |
| 0505969 | 9/1992 | European Pat. Off. . |
| 62-105951 | 7/1987 | Japan . |

Primary Examiner—David H. Bollinger
Attorney, Agent, or Firm—Wenderoth, Lind & Ponak

[57] ABSTRACT

A paper supplying device includes a pair of opposite upper and lower paper supplying rollers, each having a hemicylindrical portion defining an increased frictional circumferential surface having a frictional force greater than the remaining surface of the respective roller. A pair of feed rollers are arranged on a downstream side of the paper supplying rollers at a distance shorter than a circumferential length of the increased frictional circumferential surface of the paper supplying rollers. A rotation change over device drives the paper supplying rollers in changeable rotational directions between a regular rotational direction and a reverse rotational direction. A pair of upper and lower assist rollers are arranged with a bundle of manuscript sheets placed on a paper supplying tray therebetween. The assist rollers are rotated in the same direction synchronously with the paper supplying rollers. The order of supply of the manuscript sheets can be changed over between supply from an uppermost manuscript sheet in the bundle and supply from a lowermost manuscript sheet in the bundle.

7 Claims, 6 Drawing Sheets

PAPER SUPPLYING DEVICE

BACKGROUND OF THE INVENTION

1. Field of the Invention

The present invention relates to a paper supplying device for automatically supplying manuscript sheets in a multi-functional machine having a facsimile function and a copying function.

2. Prior Art

A facsimile apparatus having a copying function is known. A paper supplying device in such multi-functional facsimile apparatus has either an overfeed paper supplying function, supplying manuscript sheets on a paper supplying tray, or an underfeed paper supplying function, supplying manuscript sheets in turn from a lowermost manuscript sheet of the bundle on the paper supplying tray. Thus, when the paper supplying device having the overfeed paper supplying function is used as the facsimile apparatus, if the manuscript sheets are arranged on the paper supplying tray with the image surfaces thereof facing upwardly so as to continue feeding downwardly in turn from the manuscript sheet having the smallest page number, the manuscript sheets are supplied in turn from the manuscript sheet having the smallest page number. Thus, images of the manuscript sheets are transmitted to a facsimile apparatus in another office in that order.

In addition, when the paper supplying device having the underfeed paper supplying function is used as the facsimile apparatus, if the manuscript sheets are arranged on the paper supplying tray with the image surfaces thereof facing downwardly so as to continue feeding upward in turn from the manuscript sheet having the smallest page number, the manuscript sheets are supplied in turn from the manuscript sheets having the smallest page number. Thus, images of the manuscript sheets are transmitted to a facsimile apparatus in another terminal in that order.

However, manuscript sheets usually are positioned to continue downwardly in turn from a manuscript sheet having the smallest page number and with the image surfaces facing upwardly, regardless of whether the images of the manuscript sheets are transmitted by use of the facsimile function or whether the manuscript sheets are copied by use of the copying function. Therefore, when the above described facsimile apparatus is used as a copying machine, the copied paper sheets are discharged onto a paper discharge tray in turn from the copied paper sheet having the smallest page number and are stacked in a bundle of copied paper sheets continuing upwardly in turn from the copied paper sheet having a smallest page number. As a result, the problem occurs that the copied paper sheets must be restacked in the opposite order.

One example of a similar paper supplying device capable of being changed over between an overfeed paper supplying mode supplying paper sheets in turn from the uppermost paper sheet of a bundle of paper sheets placed on a paper supplying tray and an underfeed paper supplying mode supplying paper sheets in turn from the lowermost paper sheet of the bundle is disclosed in Japanese Utility Model Application Laid-Open No. Sho 62-105951. In such paper supplying device, a paper supplying passage is branched into an upper paper supplying passage and a lower paper supplying passage. The paper supplying tray is capable of being connecting with either one of the upper paper supplying passage or the lower paper supplying passage and is changed over therebetween. A reversibly rotatable access body of revolution is provided between the upper paper supplying passage and the lower paper supplying passage, and a pair of separating rollers are arranged on the downstream sides of the upper and lower paper supplying passages. In the upper paper supplying passage, the access body of revolution is pushed against an upper side of the bundle of paper sheets and the sheets are supplied in turn from the upper side of the bundle by rotating the access body of revolution. In the lower paper supplying passage, the access body of revolution is pushed against a lower side of the bundle and the sheets are supplied in turn from the lower side of the bundle by rotating the access body of revolution. At this time, even though, for example, the paper sheets are overlappedly supplied, the paper sheets can be separated by means of a pair of downstream separating rollers, such that the sheets are properly supplied one-by-one.

However, in the above described paper supplying device, problems occur in that, not only must the paper supplying passage be branched into the upper paper supplying passage and the lower paper supplying passage, but also the paper supplying tray must be changed in position relative to the upper and lower paper supplying passages and be connected with the upper and lower paper supplying passages. Thus, the tray also must be changed over and is complicated in construction.

In view of the above described conventional disadvantages, it is an object of the present invention to provide a paper supplying device for use in a multi-functional machine having a facsimile function and a copying function and capable of being changed over between an overfeed paper supplying mode and an underfeed paper supplying mode, depending on whether the multi-functional machine is used as a facsimile apparatus or as a copying machine.

SUMMARY OF THE INVENTION

The present invention provides a paper supplying device including a pair of opposite upper and lower paper supplying rollers arranged at a position such that a bundle of manuscript sheets placed on a paper supplying tray may be therebetween. Each such roller has two hemicylindrical surface portions one of which has an increased frictional circumferential surface formed to provide frictional force or resistance greater than the other. A drive drives the paper supplying rollers in rotation. A pair of feed rollers are arranged downstream of the paper supplying rollers at a distance shorter than a circumferential length of said surface of the paper supplying rollers. The feed rollers pass a manuscript sheet, sent thereto from the paper supplying rollers, to a manuscript table. A rotation change over assembly drive one of the paper supplying rollers by rotation of the drive and changes the direction of rotation of the pair of paper supplying rollers between a regular rotational direction, whereat the pair of paper supplying rollers are rotated in the same direction as the drive, and a reverse rotational direction, whereat the pair of paper supplying rollers are reversely rotated. A rotational force transmitting assembly transmits a rotational force of an axle or shaft of the one paper supplying roller to an axle or shaft of the other paper supplying roller. A pair of upper and lower assist rollers are arranged with the bundle of manuscript sheets on the paper supplying tray therebetween. The assist rollers are rotated in the same direction synchronously with the paper supplying rollers during an operation of transmission of images or during a copying operation. One assist roller acts on a side of the one paper supplying roller as a support member supporting the bundle of manuscript sheets. The other assist roller acts on the side of the other paper supplying roller as a pressing member urging the bundle of manuscript sheets toward the pair of paper supplying rollers. As a result, the manuscript sheets are drawn from the bundle by the increased frictional circumferential surface portion of the other paper supplying roller and are passed thereby to the feed rollers.

The paper supplying roller according to the present invention can mean a lower paper supplying roller 5 rotated in the same rotational direction (for example the clockwise direction) as a stepping motor 14 (the drive for rotatably driving the paper supplying rollers), as shown in FIG. 5, when use of the facsimile function is selected. On the other hand, the one paper supplying roller can mean an upper paper supplying roller 4 rotated in a direction (counterclockwise direction) opposite to the rotational direction (for example clockwise direction) of the stepping motor 14 (the drive for rotatably driving the paper supplying rollers), as shown in FIG. 6, when a use of the copying function is selected.

That is to say, according to the above described construction of the present invention, provided that for example an overfeed paper supplying function of the paper supplying device is operated when use of the facsimile function is selected by a selecting means, manuscript sheets positioned on the paper supplying tray facing upwardly in turn with a smallest page number uppermost are supplied in turn from the uppermost manuscript sheet of the bundle. That is, the manuscript sheets are transmitted, in turn starting with the sheet having the smallest page number, to another office.

On the other hand, when use of the copying function is selected by the selecting means, the underfeed paper supplying function of the paper supplying device is operated. Accordingly, if the manuscript sheets are positioned on the paper supplying tray with the smallest page number at the top in the same manner as during the facsimile function, the manuscript sheets are supplied in turn from the lowermost manuscript sheet having the largest page number. Thus, copied paper sheets are stacked on a paper discharge tray in order from the copied paper sheet having the largest page number to a copied paper sheet having the smallest page number. That is to say, the copied paper sheets are piled on the paper discharge tray to continue downwardly in turn from the copied paper sheet having the smallest page number and with image surfaces thereof facing upwardly.

Moreover, according to the present invention, when the pair of paper supplying rollers are changed over to the regular rotational mode by the rotation change over assembly, the uppermost paper sheet in the bundle of paper sheets is urged toward the paper supplying rollers by one assist roller brought into contact with the upper side of the bundle. Such upper sheet is passed to the feed rollers on the downstream side by the surface having a larger frictional force of the upper paper supplying roller. The leading end of such upper sheet is between the feed rollers at a time when feed of such sheet by the surface having the larger frictional force is not yet finished, followed by further supply of such by the feed rollers. When the paper supplying rollers are changed over to the reverse rotational mode by the rotation change over assembly, the lowermost paper sheet of the bundle is urged by the other assist roller brought into contact with the lower side of the bundle. The lower sheet is sent toward the feed rollers by the surface having the larger frictional force of the lower paper supplying roller and transferred thereby to the feed rollers.

DETAILED DESCRIPTION OF PREFERRED EMBODIMENT

The preferred embodiments of the present invention will be described below with reference to the drawings.

Figure 1:
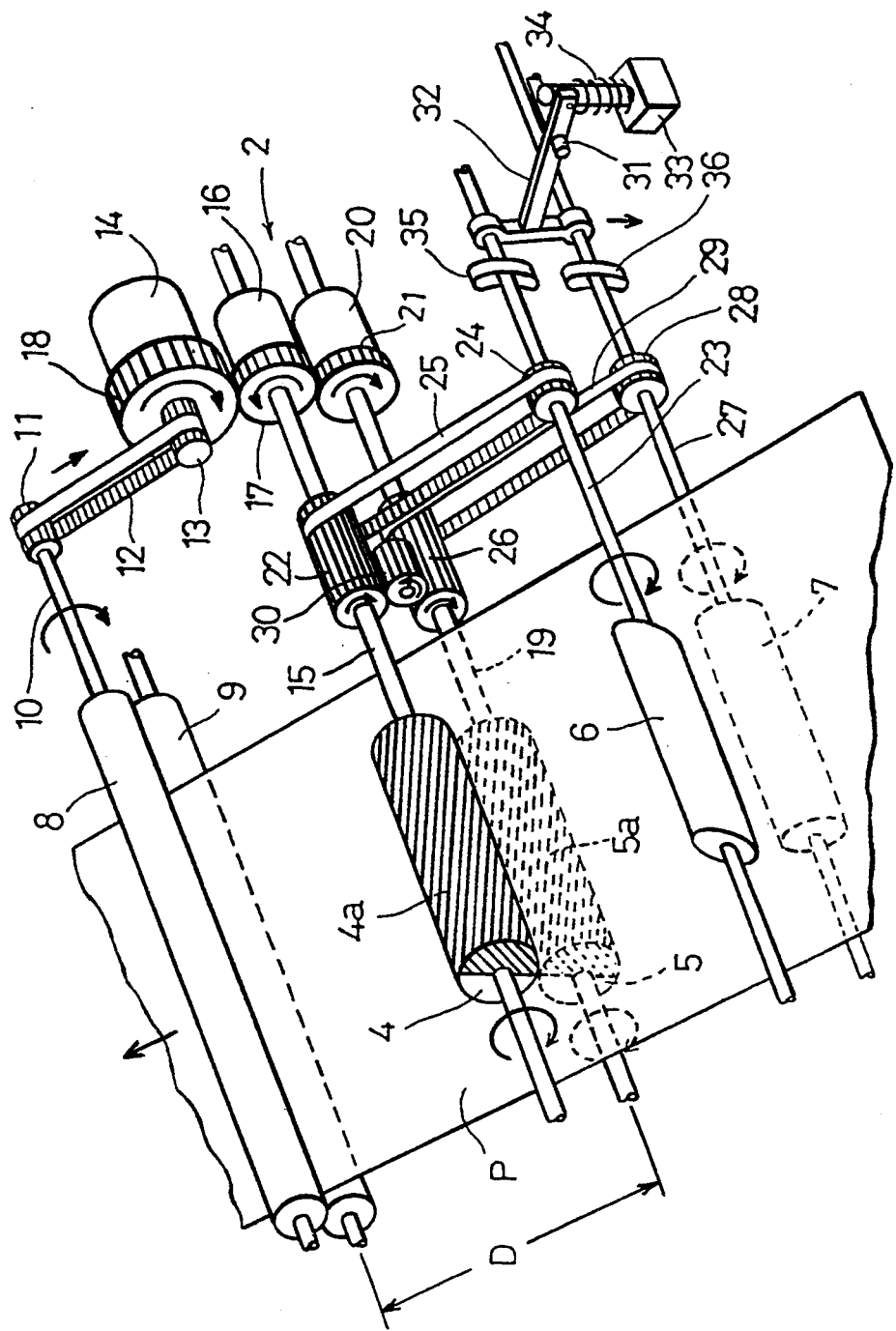
FIG. 1 is a perspective view showing a condition during a time when a facsimile function of a paper supplying device of one preferred embodiment of the present invention is operated.
Figure 2:
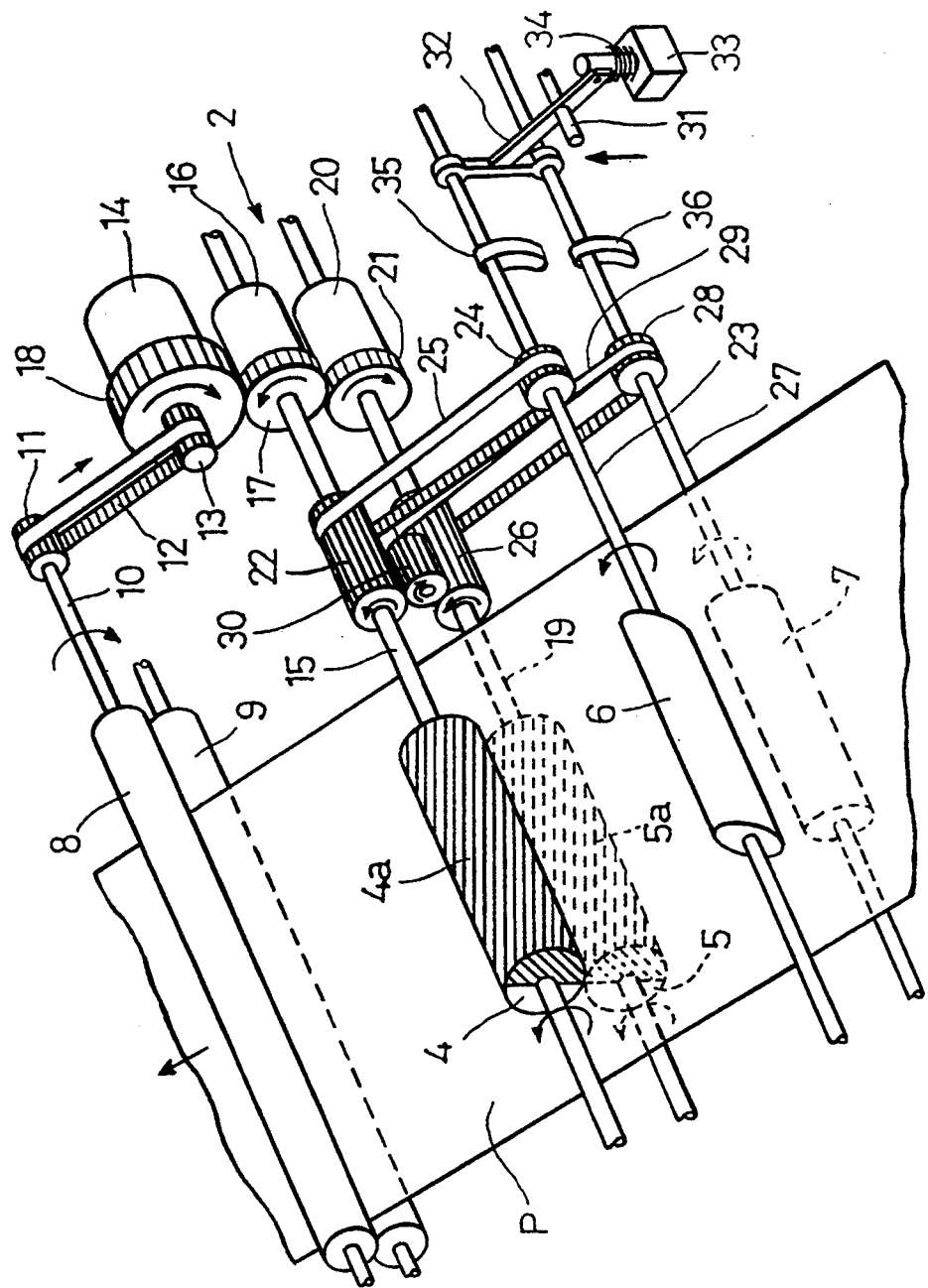
FIG. 2 is a perspective view showing a condition during a time when a copying function of such paper supplying device is operated.
Figure 3:
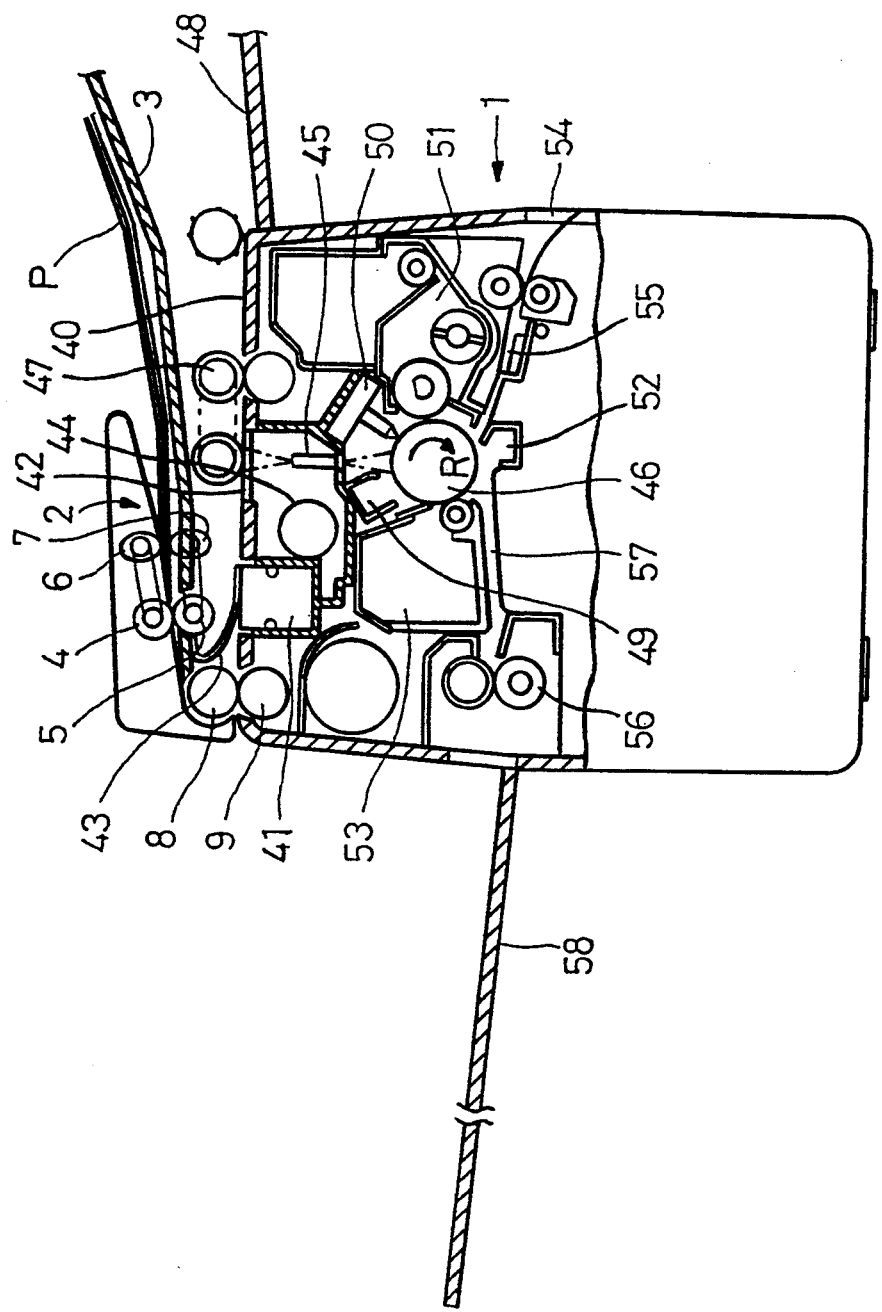
FIG. 3 is a partially broken away side view showing a facsimile apparatus in which the paper supplying device is incorporated.

FIGS. 1 and 2 are perspective views showing a construction of a paper supplying device 2 according to the present invention, and FIG. 3 is a partially broken away side view showing a facsimile apparatus 1 in which paper supplying device 2 is incorporated.

Facsimile apparatus 1 shown in FIG. 3 is a complex machine having a copying function in addition to a facsimile function. Paper supplying device 2 comprises a pair of opposite upper and lower paper supplying rollers 4, 5 arranged to have positioned therebetween a bundle of manuscript sheets placed on a paper supplying tray 3. Each roller 4, 5 has two hemicylindrical circumferential surface portions, one of which is formed to provide a greater frictional force or resistance than the other. A stepping motor 14 rotatably drives paper supplying rollers 4, 5. A pair of feed rollers 8, 9 are arranged downstream of the paper supplying rollers 4, 5 at a distance less than the circumferential length of each of the paper supplying rollers 4, 5. Rollers 8, 9 pass a manuscript sheet supplied from the paper supplying rollers 4, 5 to a manuscript table 40. Clutches or rotation changing devices 16, 20 drive respective axles or shafts 15, 19 defining axes of rotation of paper supplying rollers 4, 5 in response to rotation of stepping motor 14 and enable changing over rotational directions of paper supplying rollers 4, 5 between a regular rotational direction, in which the paper supplying rollers 4, 5 are rotated in the same direction as the stepping motor 14, and a reverse rotational direction, in which the paper supplying rollers 4, 5 are reversely rotated. Gears 22, 26 are provided on shafts 15, 19 and engage an intermediate gear 30 to form a rotational force transmitting assembly for transmitting a force of rotation of one paper supplying roller to the other paper supplying roller. A pair of opposite upper and lower assist rollers 6, 7 are arranged on the side of rollers 4, 5 opposite rollers 8, 9. A bundle or stack of manuscript sheets placed on paper supplying tray 3 is positioned between rollers 6, 7. Rollers 6, 7 are rotated in the same direction synchronously with the paper supplying rollers 4, 5 during transmission of an image or a copying operation. One roller 6, 7 acts as a support member supporting the bundle of manuscript sheets and the other roller 6, 7 acts as a pressing member pressing the bundle of manuscript sheets toward the pair of paper supplying rollers 4, 5, whereat a sheet is drawn or moved from the bundle of manuscript sheets toward the feed rollers 8, 9 by the greater frictional force circumferential surface portion of the corresponding paper supplying roller 4, 5.

A contact image sensor 41, a glass plate 42 and the like are arranged on manuscript table 40 to which a manuscript sheet P is supplied by the paper supplying device 2. Contact image sensor 41 is a device for reading out an image of manuscript sheet P urged by a polyester film member 43 toward sensor 41. When the image of the manuscript sheet P is read by the contact image sensor 41, image data are converted thereby to digital signals to be transmitted. Glass plate 42 applies a light from a light source 44 forming an exposing device to an image surface of the manuscript sheet P, and the resulting optical image is exposed by a self-focusing lens 45 onto a surface of a photoreceptor 46 arranged below manuscript table 40. The manuscript sheet P then is discharged from glass plate 42 onto a manuscript receiving table 48 by discharging rollers 47. A charger 49, an LED print head 50, a developing device 51, a transfer separating device 52 and a cleaning device 53 are arranged in a rotational direction of photoreceptor 46, in the order described, around the photoreceptor 46, in addition to the exposing device. LED print head 50 is a device for converting image data received by a facsimile function to optical signals to expose the resulting optical signals onto the surface of the photoreceptor 46. A paper supplying passage 55 and a paper discharging passage 57 respectively extend from a paper supplying port 54 to transfer separating device 52 and from transfer separating device 52 to a fixing device 56. Copied paper sheets discharged through fixing device 56 are discharged onto a paper discharge tray 58.

In the paper supplying device 2 shown in FIG. 1, the respective hemicylindrical portions (shows shaded) define outer circumferential surfaces 4a, 5a of the paper supplying rollers 4, 5 that have a frictional force larger than that of the outer circumferential surfaces defined by the other hemicylindrical portions thereof. The circumferential lengths of the outer circumferential surfaces 4a, 5a of the paper supplying rollers 4, 5 are greater than a length D from paper supplying rollers 4, 5 to feed rollers 8, 9.

Rotation of an axle or shaft 10 defining an axis of rotation of the upper feed roller 8 is transmitted thereto from stepping motor 14 by gears 18, 13, a belt 12 and a gear 11.

The lower feed roller 9 is pressed toward the upper feed roller 8 and thus is rotated by friction. Rotation of axle or shaft 15 defining an axis of rotation of the upper paper supplying roller 4 is transmitted thereto from the stepping motor 14 by gear 18 and by gear 17 of clutch 16 through said gear 18. Rotation of axle or shaft 19 defining axis of rotation of the lower paper supplying roller 5 is transmitted thereto by a gear 21 engaged with gear 17.

Axle 15 of the upper paper supplying roller 4 is provided with gear 22 that is connected by a belt 25 with a gear 24 provided on an axle or shaft 23 defining an axis of rotation of assist roller 6. Axle 19 of the lower paper supplying roller 5 is provided with gear 26 that is connected by a belt 29 with a gear 28 provided on an axle or shaft 27 defining an axis of rotation of assist roller 7. Intermediate gear 30 is engaged with gear 22 and gear 26.

The assist rollers 6, 7 each have an elliptical sectional shape. Rollers 6 and 7 are oriented such that long axes thereof are shifted by 90° with respect to each other. Axles 23, 27 of rollers 6, 7 are supported by a supporting arm 32 that is swingable upwardly and downwardly about a supporting shaft 31 as a fulcrum. Supporting arm 32 is connected at an opposite end thereof with a solenoid 33. Supporting ram 32 is urged by a spring 34 to lower axles 23, 27 (FIG. 1). Activation of solenoid 33 pivots arm 32 against the force of spring 34 to move axles 23, 27 upwardly (FIG. 2). When solenoid 33 is deactivated, spring 34 again moves axles 23, 27 and thus rollers 6, 7 downwardly. The axles 23, 27 of the assist rollers 6, 7 is inserted into respective semicircular guide sleeves 35, 36 guiding such upward and downward movement.

Figure 4:
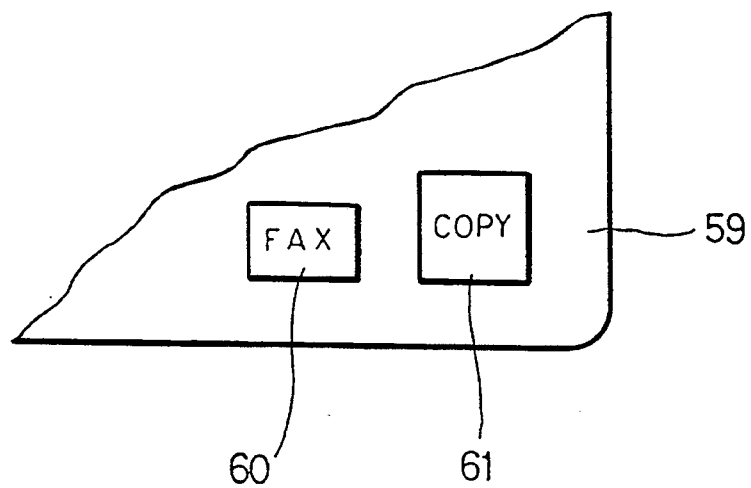
FIG. 4 is a partial plan view showing an operating portion of such facsimile apparatus.

An operating portion 59 of the facsimile apparatus 1 is provided with a facsimile button 60 for inputting an operation starting instruction of a facsimile function and a copying button 61 for inputting an operation starting instruction of the copying function, as shown in FIG. 4. Upon initiating the operation starting instruction of the facsimile function by operation of facsimile button 60, the clutch 16 is switched off and the clutch 20 is switched on (FIG. 1). Upon initiating the operation starting instruction of the copying function by operation of copying button 61, the clutch 16 is switched on and the clutch 20 is switched off (FIG. 2).

Operation of the paper supplying device 2 will be described below with reference to FIG. 5 and 6, respectively, for an operation where the facsimile function of the facsimile apparatus 1 is used and an operation where the copying function of the facsimile apparatus 1 is used.

Figure 5A:
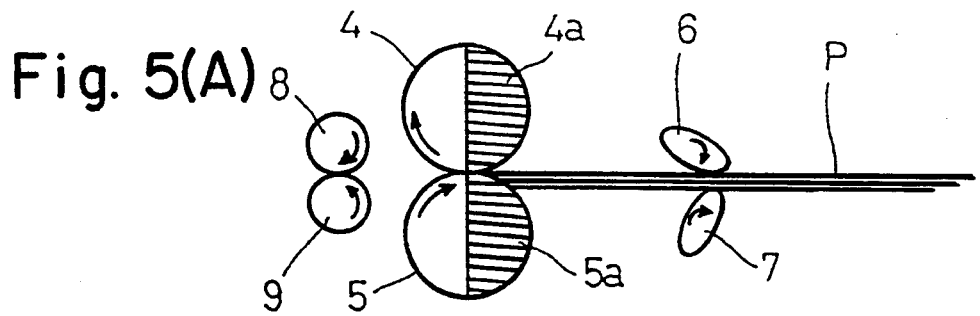
FIGS. 5(A)–5(D) are operation diagrams during a time when the facsimile function of the paper supplying device is operated.

(1) Operation when the facsimile function of the facsimile apparatus is used:

In order to transmit an image of a manuscript sheet P to a facsimile apparatus at another terminal by the facsimile function, the stack or bundle of manuscript sheets P is arranged on the paper supplying tray 3 with the lowest number sheet upwardly and with the surfaces to be imaged facing upwardly. Under a reset condition, the upper and lower paper supplying rollers 4, 5 are set such that the increased frictional circumferential surface portions 4a, 5a are oriented toward the assist rollers 6, 7, as shown in FIG. 5(A).

Upon inputting an operation starting instruction of the facsimile function by pushing the facsimile button 60, the clutch 16 is switched off and the clutch 20 is switched on. Thus, the rotation of the stepping motor 14 is transmitted to the lower paper supplying roller 5 through the gears 18, 17 and 21, the clutch 20 and the axle 19. In addition, the rotation of the lower paper supplying roller 5 is transmitted to the upper paper supplying roller 4 through the gear 26, the intermediate gear 30, the gear 22 and the axle 15. As a result, the upper and lower paper supplying rollers 4, 5 are rotatably driven clockwise.

Furthermore, the rotation of the stepping motor 14 is transmitted to the feed rollers 8, 9 through the gear 13, the belt 12, the gear 11 and the axle 10. Thus, the upper feed roller 8 is rotatably driven clockwise and the lower feed roller 9 urged toward the upper feed roller 8 is rotatably driven counterclockwise. That is to say, the feed rollers 8, 9 are rotatably driven so that manuscript sheets P sent from the paper supplying rollers 4, 5 may be fed to the manuscript table 40.

Rotation of the upper paper supplying roller 4 is transmitted to the upper assist roller 6 through the gear 22, the belt 25, the gear 24 and the axle 23 and rotation of the lower paper supplying roller 5 is transmitted to the lower assist roller 7 through the gear 26, the belt 29, the gear 28 and the axle 27. Thus, the upper and lower assist rollers 6, 7 are rotatably driven in the same direction as the upper and lower paper supplying rollers 4, 5. At this time, the solenoid 33 is not activated. Accordingly, the supporting arm 32 is pivoted by the force of the spring 34 such that the upper and lower assist rollers 6, 7 are moved downwardly, as shown in FIG. 1. That is to say, at this time the upper assist roller 6 approaches the upper surface of the bundle of manuscript sheets P while the lower assist roller 7 is slightly separated from the lower surface of the bundle of manuscript sheets P, as shown in FIG. 5(B).

Figure 5B:
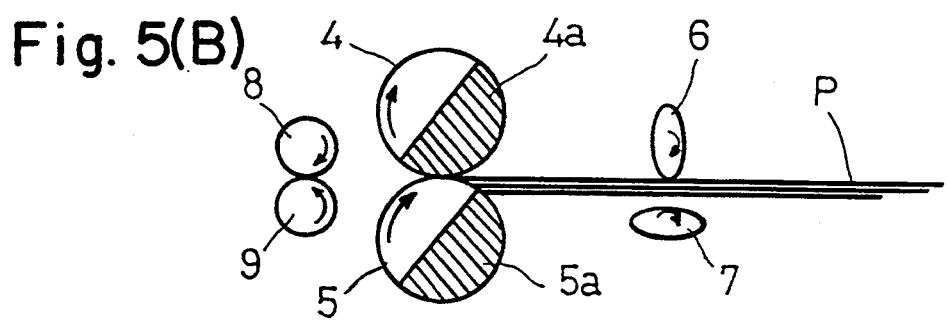
Figure 5C:
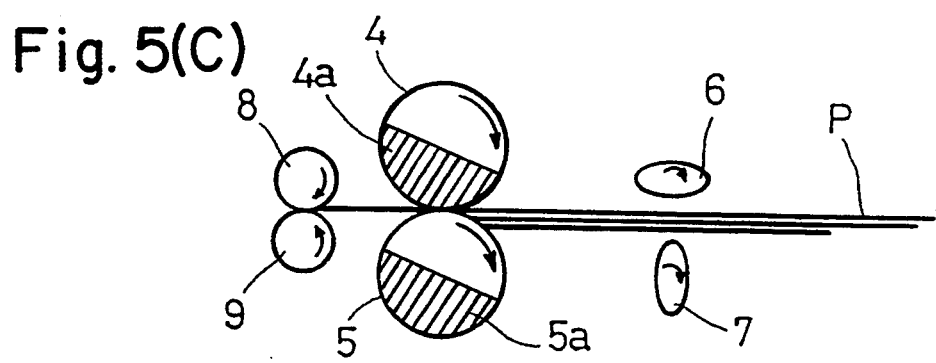

Under this condition, upon rotating the paper supplying rollers 4, 5 and the assist rollers 6, 7, the uppermost manuscript sheet P is fed to the feed rollers 8, 9 from the bundle of manuscript sheets P by the operations shown in FIG. 5(B) and FIG. 5(C). That is to say, since the upper and lower assist rollers 6, 7 are aligned with the long axes thereof extending at an angle of 90° relative to each other, the upper sheet of the bundle of manuscript sheets P is pushed toward the paper supplying rollers 4, 5 by a circumferential surface portion at the long axis of the upper assist roller 6. At this time, the lower assist roller 7 takes an almost transverse posture to function as a member for receiving or supporting the bundle of manuscript sheets P. As a result, the uppermost manuscript sheet P is drawn out from the bundle and forwarded toward the feed rollers 8, 9 by the increased frictional circumferential surface portion 4a of the upper paper supplying roller 4.

Figure 5D:
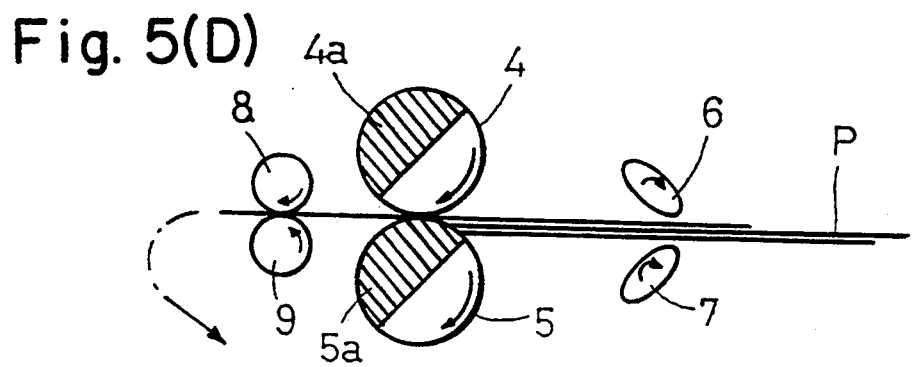

Since the circumferential length of the increased frictional circumferential surface portion 4a of the paper supplying roller 4 is longer than distance D from the paper supplying rollers 4, 5 to the feed rollers 8, 9, the leading end of the manuscript sheet P is positioned between the feed rollers 8, 9, to supply the manuscript sheet P to the manuscript table 40 of the facsimile apparatus 1 as shown in FIG. 5(D), during the time the drawing-out operation of such sheet P by the increased frictional circumferential surface portion 4a still occurs.

Thus, manuscript sheets P on the paper supplying tray 3 are supplied to the manuscript table 40 in turn from the uppermost manuscript sheet, that is the manuscript sheet having the smallest page number. The image of each manuscript sheet P supplied to the manuscript table 40 is read by the contact image sensor 41 and the read-out image data is converted to a digital signal to be transmitted to a facsimile apparatus at another terminal. The manuscript sheet P, the image of which has been read, is passed to manuscript receiving table 48 by discharging rollers 47. As a result, images of the manuscript sheets P are transmitted in order from the manuscript sheet having the smallest page number.

Figure 6A:
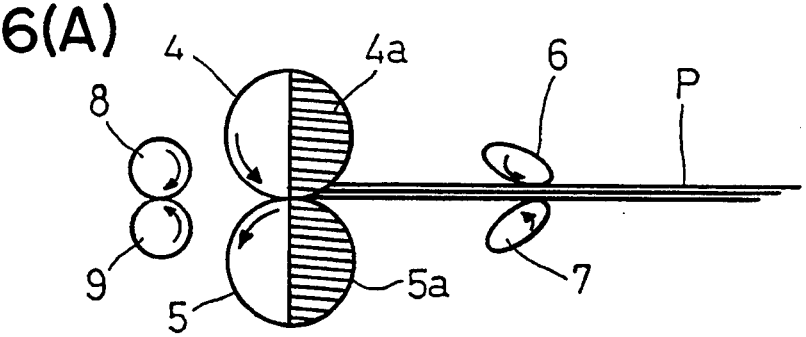
FIGS. 6(A)–6(D) are operation diagrams during a time when the copying function of the paper supplying device is operated.

(2) Operation when the copying function is used:

To copy images of the manuscript sheets P by the copying function, the bundle of manuscript sheets P is arranged to continue downwardly from the manuscript sheet having the lowest page number on the paper supplying tray 3 (FIG. 3) with the surfaces of sheets to be imaged facing upwardly, in the same manner as that described above regarding operation when the facsimile function is used. Under a reset condition, the upper and lower paper supplying rollers 4, 5 are set such that the increased frictional circumferential surface portions 4a, 5a are oriented toward the assist rollers 6, 7, as shown in FIG. 6(A), in the same manner as that described above when the facsimile function is used.

Upon inputting an operation starting instruction of the copying function by pushing the copying button 61, the clutch 16 is switched on and the clutch 20 is switched off. Thus, the rotation of the stepping motor 14 is transmitted to the upper paper supplying roller 4 through the gears 18 and 17, the clutch 16 and axle 15. In addition, the rotation of the upper paper supplying roller 4 is transmitted to the lower paper supplying roller 5 through the gear 22, the intermediate gear 30, the gear 26 and the axle 19. As a result, the upper and lower paper supplying rollers 4, 5 are rotatably driven counter-clockwise.

The rotation of the stepping motor 14 is transmitted to the feed rollers 8, 9 through the gear 13, the belt 12, the gear 11 and the axle 10 in the same manner as that described above when the facsimile function is used.

Rotation of the upper paper supplying roller 4 is transmitted to the upper assist roller 6 through the gear 22, the belt 25, the gear 24 and the axle 23 and rotation of the lower paper supplying roller 5 is transmitted to the lower assist roller 7 through the gear 26, the belt 29, the gear 28 and the axle 27. Thus, the upper and lower assist rollers 6, 7 are rotatably driven in the same direction as the upper and lower paper supplying rollers 4, 5. At this time, the solenoid 33 is activated and the supporting arm 32 is pivoted against the force of the spring 34 and thus the upper and lower assist rollers 6, 7 are pushed upwardly, as shown in FIG. 2. That is to say, at this time the lower assist roller 7 approaches the lower surface of the bundle of manuscript sheets P while the upper assist roller 6 is slightly separated from the upper surface of the bundle of manuscript sheets P.

Figure 6B:
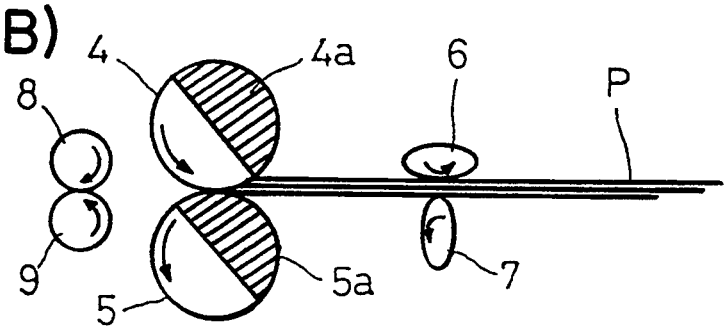
Figure 6C:
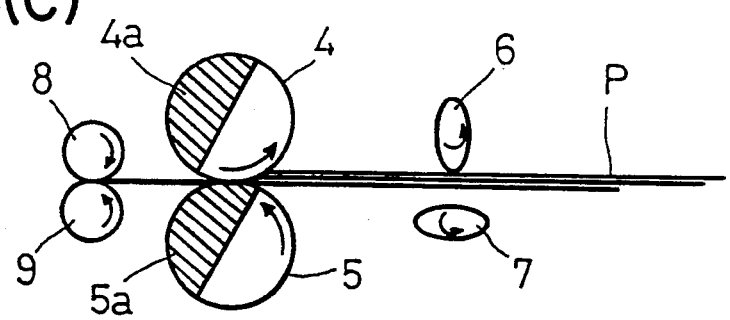

Under this condition, upon rotating the paper supplying rollers 4, 5 and the assist rollers 6, 7, the lowermost manuscript sheet P is fed to the feed rollers 8, 9 from the bundle of manuscript sheets P by the operations shown in FIG. 6(B) and FIG. 6(C). That is to say, since the upper and lower assist rollers 6, 7 are aligned with the long axes thereof extending at an angle of 90° relative to each other, the lower sheet of the bundle of manuscript sheets P is pushed toward the paper supplying rollers 4, 5 by a circumferential surface portion at the long axis of the lower assist roller 7. At this time, the upper assist roller 6 takes an almost transverse posture to function as a member for receiving or supporting the bundle of manuscript sheets P. As a result, the lowermost manuscript sheet P is drawn out from the bundle and forwarded toward the feed rollers 8, 9 by the increased frictional circumferential surface portion 5a of the lower paper supplying roller 5.

Figure 6D:
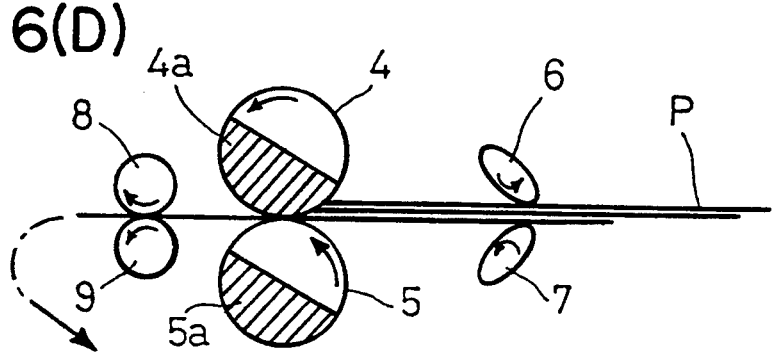

Since the circumferential length of the increased frictional circumferential surface portion 5a of the paper supplying roller 5 is longer than the distance D from the paper supplying rollers 4, 5 to the feed rollers 8, 9, the leading end of the manuscript sheet P is positioned between the feed rollers 8, 9, to supply the manuscript sheet P to the manuscript table 40 of the facsimile apparatus 1 as shown in FIG. 6(D), during the time the drawing-out operation of such sheet P by the increased frictional circumferential surface portion 5a still occurs.

Thus, manuscript sheets P on the paper supplying tray 3 are supplied to the manuscript table 40 in turn from the lowermost manuscript sheet, that is the manuscript sheet having the largest page number. The image of each manuscript sheet P supplied to the manuscript table 40 is illuminated with light from light source 44 and the resulting optical image is exposed onto a surface of photoreceptor 45 by self-focusing lens 45. The exposed image is developed by developing device 51 and transferred to a copying paper sheet supplied through paper supplying passage 55 from paper supplying port 54 by transfer separating device 52. The transferred copying paper sheet is separated from the photoreceptor 46 and is sent to fixing device 56 through paper discharging passage 57, and the fixed copying paper sheet is discharged to paper discharge tray 58. The exposed manuscript sheet P is passed to manuscript receiving table 48 by discharging rollers 47. As the result, the copied paper sheets are stacked on the paper discharge tray 58 in turn from a sheet having the largest paper number. That is to say, the copied papers are stacked on the paper discharge tray 58 with image surfaces thereof turning upwardly in turn so as to continue downwardly from a sheet having the smallest page number.

The above description involves an alignment of the manuscript sheets P stacked on the paper supplying tray 3 with image surfaces thereof turned upwardly and with the manuscript sheet having the smallest page number positioned uppermost. However, the present invention can be employed also to an arrangement where the manuscript sheets P are stacked on the paper supplying tray 3 with image surfaces thereof facing downwardly and with the manuscript sheet having the smallest page number positioned lowermost. In such case, the copied paper sheets can be stacked on the paper discharge tray 58 in turn to continue downwardly from a copied paper sheet having the smallest page number during copying, by supplying the manuscript sheets in turn from the lowermost manuscript sheet in the bundle of manuscript sheets during transmission of images, and by supplying the manuscript sheets in turn from the uppermost manuscript sheet in the bundle during copying.

The present invention has the above described construction, and the paper supplying device in the multi-functional machine having a facsimile function and a copying function is provided with paper supplying means having an overfeed paper supplying function, supplying manuscript sheets in turn from an uppermost manuscript sheet of a bundle of manuscript sheets on a paper supplying tray, and an underfeed paper supplying function, supplying manuscript sheets in turn from a lowermost manuscript sheet of the bundle. A change over device changes the paper supplying means between the overfeed paper supplying function and the underfeed paper supplying function, depending upon selected use of the facsimile function or the copying function. Thereby, order of supply of the manuscript sheets of a bundle of manuscript sheets can be changed over between supply from the uppermost manuscript sheet in the bundle supply from the lowermost manuscript sheet in the bundle, depending on whether the multi-functional machine is used as a facsimile apparatus or as a copying apparatus. Accordingly, the images can be transmitted in turn from the manuscript sheet having the smallest page number during transmission of manuscript images, and copying paper sheets can be stacked in turn from a sheet having the smallest page number during copying of manuscript images.

Moreover, the present invention of the above described construction includes a pair of oppositely arranged paper supplying rollers at positions such that a bundle of paper sheets placed on a paper supplying tray are pressed at front or leading ends thereof at increased frictional circumferential surface portions of such rollers, each such surface portion having a frictional force that is greater than that of another circumferential surface portion of the same roller. A pair of feed rollers are arranged at a position spaced from the paper supplying rollers by a distance shorter than the circumferential length of the increased friction portion of each of the paper supplying rollers. A rotation change over means changes the direction of rotation of the paper supplying rollers between a regular rotational direction and a reverse rotational direction. Thus, the order of supply of paper sheets in the bundle of paper sheets can be changed over between paper supply from the uppermost paper sheet and paper supply from the lowermost paper sheet. This is achieved by a simple construction.

What is claimed is:

1. A paper supplying device for supplying manuscript sheets from a bundle of manuscript sheets stacked on a paper supply tray to a manuscript table, said device comprising:

a pair of opposite upper and lower paper supply rollers having respective axes of rotation, each said paper supply roller having two hemicylindrical surface portions including a first said surface portion having a greater frictional resistance than a second said surface portion;

a pair of feed rollers positioned in a downstream direction from said paper supply rollers by a distance less than a circumferential length of said first surface portion of each of said paper supply rollers;

drive means for generating rotation in a drive direction;

rotation change-over means, operative to receive rotation from said drive means and operatively connected to said paper supply rollers to transmit rotation to a selected one of said paper supply rollers, for selectively changing said selected one paper supply roller between a first said paper supply roller that is caused to rotate in a regular direction corresponding to said drive direction and a second said paper supply roller that is caused to rotate in a reverse direction opposite to said drive direction;

rotation force transmitting means, operatively connected to said paper supply rollers, for transmitting rotation of said selected one paper supply roller to rotation in the same direction of the other paper supply roller, such that both said paper supply rollers rotate in the same direction; and a pair of opposite upper and lower assist rollers positioned in an upstream direction from said paper supply rollers and rotatable in the same direction synchronously with said paper supply rollers, said assist rollers being located such that the bundle of manuscript sheets is positionable therebetween, one said assist roller being operable as a support member supporting a first side of the bundle, and the other said assist roller being operable as an urging member acting on a second side of the bundle to urge a manuscript sheet therefrom in a downstream direction toward said paper supply rollers;

whereby a manuscript sheet is urged by said other assist roller to said paper supply rollers, wherefrom the manuscript sheet is moved by said first surface portion of a corresponding said paper supply roller to said feed rollers, that then pass the manuscript sheet to the manuscript table.

2. A device as claimed in claim 1, wherein said device is operatively assembled in a multi-functional machine operable alternatively in a facsimile mode or in a copying mode.

3. A device as claimed in claim 1, wherein when said rotation change-over means operates to rotate said first paper supply roller in said regular direction, said upper assist roller operates as said urging member to urge an uppermost manuscript sheet in the downstream direction, and said first surface portion of said upper paper supply roller moves the uppermost manuscript sheet to said feed rollers, and when said rotation change-over means operates to rotate said second paper supply roller in said reverse direction, said lower assist roller operates as said urging member to urge a lowermost manuscript sheet in the downstream direction, and said first surface portion of said lower paper supply roller moves the lowermost manuscript sheet to said feed rollers.

4. A device as claimed in claim 1, wherein said rotation change-over means comprises a pair of clutches mounted on respective axles of said paper supply rollers, said clutches being selectively engageable with respective said axles, whereat the respective said paper supply roller is said one paper supply roller, and disengageable from respective said axles, whereat the other said paper supply roller is said one paper supply roller.

5. A device as claimed in claim 1, wherein said rotation force transmitting means comprises respective gears fixed to said paper supply rollers, and an intermediate gear engaging said gears of both said paper supplying rollers.

6. A device as claimed in claim 1, wherein each said assist roller has an elliptical section including a long axis, and said pair of assist rollers are mounted with said long axes thereof extending at an angle of substantially 90° relative to each other.

7. A device as claimed in claim 1, wherein said assist rollers have respective axles, and further comprising a supporting arm having an end supporting said axles, said supporting arm being mounted to pivot about a fulcrum such that said end and said axles are movable upwardly and downwardly, a spring urging said arm to pivot such that said axles are moved downwardly, and a solenoid operable to pivot said arm against the force of said spring such that said axles are moved upwardly.

* * * * *